United States Patent
Wu et al.

(10) Patent No.: US 8,718,129 B2
(45) Date of Patent: May 6, 2014

(54) POWER SAVING DECODER ARCHITECTURE

(75) Inventors: Hsi-Jung Wu, San Jose, CA (US); Ionut Hristodorescu, San Jose, CA (US); James Oliver Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1485 days.

(21) Appl. No.: 11/934,394

(22) Filed: Nov. 2, 2007

(65) Prior Publication Data

US 2009/0092184 A1    Apr. 9, 2009

Related U.S. Application Data

(60) Provisional application No. 60/977,230, filed on Oct. 3, 2007.

(51) Int. Cl.
*H04N 7/12* (2006.01)

(52) U.S. Cl.
USPC .................................................... 375/240.01

(58) Field of Classification Search
None
See application file for complete search history.

(56) References Cited

U.S. PATENT DOCUMENTS

| 6,490,356 | B1 * | 12/2002 | Beuque .......................... 380/239 |
| 6,704,362 | B2 * | 3/2004 | Peng et al. ................ 375/240.25 |
| 7,539,879 | B2 * | 5/2009 | Terechko et al. ............. 713/300 |
| 2001/0046260 | A1 * | 11/2001 | Molloy ..................... 375/240.02 |
| 2002/0080874 | A1 * | 6/2002 | Wilson ..................... 375/240.01 |
| 2006/0020972 | A1 * | 1/2006 | Regan et al. .................... 725/46 |
| 2009/0161767 | A1 * | 6/2009 | Jang et al. ................ 375/240.24 |
| 2010/0322318 | A1 * | 12/2010 | Sadowski et al. ........ 375/240.25 |

* cited by examiner

*Primary Examiner* — Otis L Thompson, Jr.
*Assistant Examiner* — Amar Persaud
(74) *Attorney, Agent, or Firm* — Kenyon & Kenyon LLP

(57) ABSTRACT

A method and system are provided for decoding coded video data by turning off or not loading at least one functional unit or functional subunit of the decoder while decoding a portion of the coded video data. A schedule may be created prior to substantive decoding and then the schedule may be used to decode coded video data. The coded video data may be reordered based on the functional units or subunits the portions of the coded video data need for decoding. The portions of the coded video data are reordered into their original order in an output buffer after being decoded. The decoder may determine which functional units or subunits are needed for decoding based on administration information included with the coded video data. The decoder may decode portions of the coded video data in parallel.

16 Claims, 5 Drawing Sheets

[KNOWN VIDEO DECODER]

US 8,718,129 B2

POWER SAVING DECODER ARCHITECTURE

Embodiments of the present invention relate to video decoders and control systems for such that conserve power consumed by the decoders when in use.

Video decoders are known per se. Typically, video decoders are processing systems—either dedicated decoding hardware systems or general purpose processing systems executing decoder software—that reconstruct a video data stream from a coded representation of video. FIG. 1 illustrates a exemplary decoder 100 as may be known in the art. The decoder 100 decodes the coded data 102 to generate decoded data 104. The decoder 100 may perform decoding operations upon received bit streams, such as image prediction, entropy decoding, inverse quantization and inverse cosine transforms, to generate the decoded video data 104. The decoder 100 is often includes dedicated functional units 106 that perform these decoding operations.

In conventional hardware decoders, all the functional units 106 are always on (e.g., continuously powered) when decoding data. In conventional software-based decoders, all the functional units 106 are always instantiated by the software system. Such conventional "always on" behavior, however, can be wasteful because all functional units 106 are not always needed to decode all portions of the coded video data 102. When the decoder 100 is implemented in hardware the path from coded video data 102 to the decoded video data 104 may include functional units 106 that are not needed. When the decoder 100 is implemented with software not all functional units 106 need to be loaded and linked to decode all portions of the coded video data 102. Thus there is a need for a decoder 100 architecture that saves power by not always keeping all the functional units 106 on when they are not needed to decode all portions of the coded video data 102, and there is a need for a software embodiment that does not always keep all the functional units 106 loaded when they are not needed to decode all portions of the coded video data 102.

DETAILED DESCRIPTION

Embodiments of the present invention provide a resource control system for a video decoder that, prior to video decoding, scans an encoded video signal to identify functional units that are required for decoding. The resource control system schedules resources in advance to reduce resource consumption to be used while the video decoder decodes the coded video signal. In a hardware embodiment, the resource controller may selectively supply power to functional units based on an identification of the functional units that are needed to decode encoded data. By selectively supplying power to the functional units the power consumed by the decoder can be reduced. In a software embodiment, the resource controller may selectively load functional units based on an identification of the functional units that are needed to decode encoded data. By selectively loading the functional units computer resources, e.g. memory, can be conserved.

Figure 1:
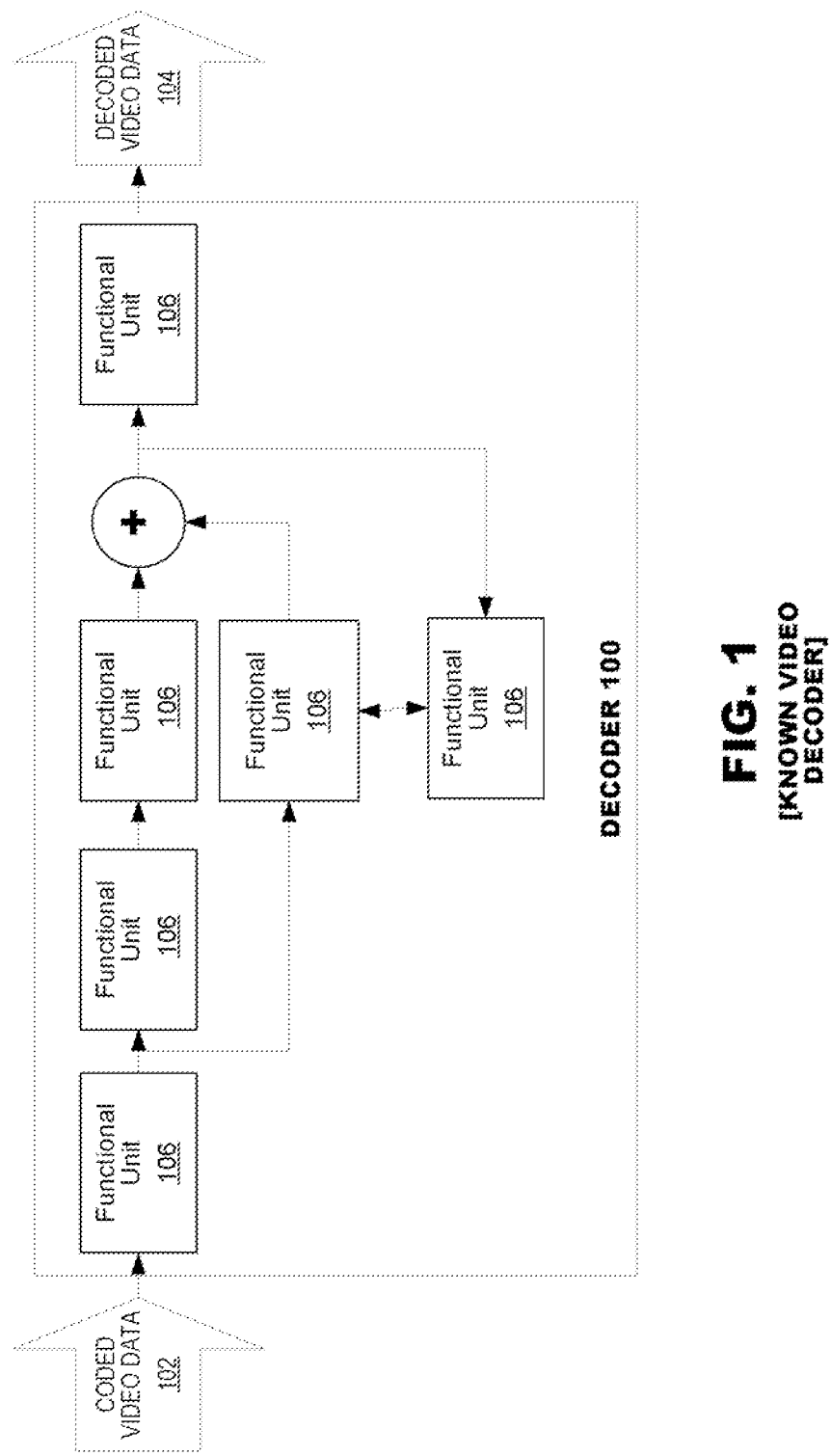
FIG. 1 illustrates a conventional decoder with functional units.
Figure 2:
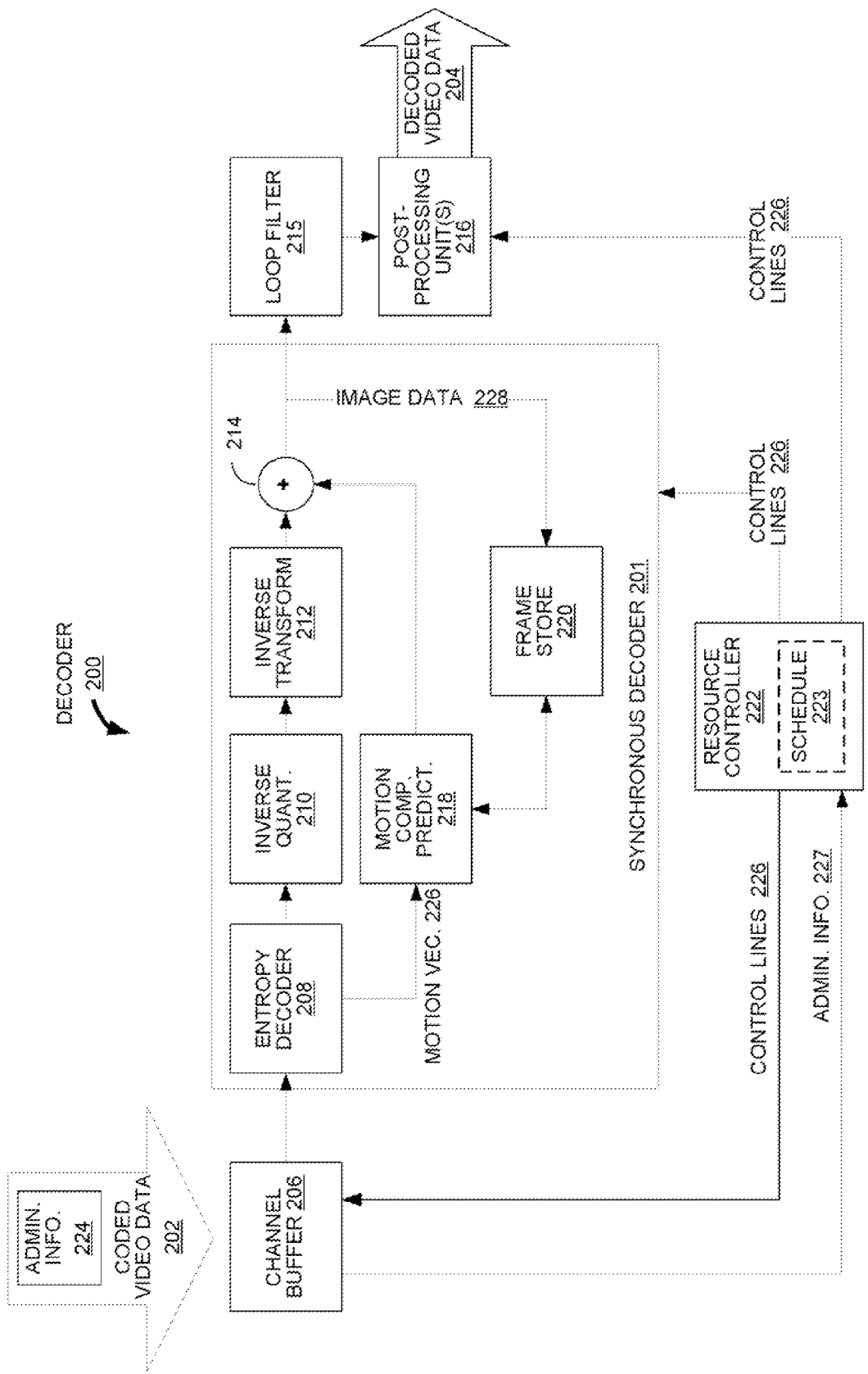
FIG. 2 illustrates a decoder with a resource controller for selectively enabling and disabling functional units according to an embodiment of the present invention.

FIG. 2 is a simplified block diagram of a decoder 200 according to an embodiment of the present invention. The decoder 200 may be implemented in hardware or software and receives coded video data 202 from a channel, which may be a communication channel formed in a wired or wireless network or may be a memory device such as an electric, magnetic or optical memory device. The decoder 200 may include a synchronous decoder 201, a channel buffer 206, a loop filter 215, various post-processing unit(s) 216, and a resource controller 222. The channel buffer 206 stores coded video data 202 received from the channel. The synchronous decoder 201 decodes video data in a manner dictated by the coded video data 202 and generates recovered video data therefrom. The post-processing unit(s) 216 perform additional processing on the recovered image data; as opposed to the processes performed by the synchronous decoder 201, the decoder 200 may have some discretion to select which processes, if any, are performed by the post-processing unit(s) 216. The resource controller 222 may schedule operation of functional units to conserve resources as discussed herein.

As discussed, the decoder 200 may be composed of functional units that perform dedicated decoding processes. The embodiment illustrated in FIG. 2 includes functional units 208, 210, 212, 214, 215, 218, and 220 that are common to present day decoders. As such FIG. 2 illustrates the following functional units: an entropy decoder 208, an inverse quantitizer 210, an inverse transformer 212, an adder 214, a loop filter 215, post-processing unit(s) 216, a motion compensated prediction unit 218, and a frame store 220. In an embodiment, some functional units perform processing that invert processes applied by an encoder (not shown) that generated the coded video data 202. The structure of the synchronous decoder 201 is merely exemplary; the principles of the present invention discussed below may find application with decoders of other designs.

Common decoders perform motion compensated prediction to generate video data from coded video data 202. Typically each frame in a video sequence is decomposed into a plurality of picture blocks. Typically, the blocks are encoded by unidirectional or bi-directional predictive coding (called "P-coding" and "B-coding" respectively), through which image content of the block is predicted from one (for P) or two (for B) reference frames elsewhere in the video sequence. Such P-coded and B-coded blocks may include data elements, called "motion vectors," that guide the decoder 200 through these predictions. Alternatively, blocks may be encoded by intra-coding, which does not refer to any other reference frames in the video sequence. Accordingly, FIG. 2 illustrates a frame store 220 to store data of reference frames that may be sources of prediction when the decoder 200 operates on P-coded or B-coded blocks. FIG. 2 also illustrates a motion compensated predictor 218 that decodes motion vectors from the encoded data 202, which may be a video signal, and generates predicted block data for the decoder.

Coded video data 202 often may include residual data for various blocks that provide additional information regarding blocks' image content and further improve the accuracy of recovered image data. The residual data may be processed by discrete cosine transforms, quantization and entropy coding to compress the residual data before transmission to the decoder 200. Accordingly, the synchronized decoder 201 is shown as including an entropy decoder 208, inverse quantizer 210, and inverse transform unit 212 that invert these processes. The decoded residual data is combined with predicted block data from the motion compensated predictor 218 to generate decoded block data. The decoded block data may be output from the synchronized decoder 201 for post-processing units(s) 216 and display (not shown). Additionally, if a decoded block is part of a reference frame, it may be stored in the frame store 220 for use during subsequent processing of encoded data 202. In this regard, the operation of a decoder 200 is well known.

Embodiments of the present invention introduce a resource controller 222 to a decoder 200. The resource controller 222 reviews coded video data 202 before it is processed substantively by a synchronized decoder 201 and identifies functional units within the synchronized decoder that perform decoding operations to generate recovered video data. The resource controller 222 further identifies functional units (or sub-units therein) that will not be used to decode coded video data 202. The resource controller 222 keeps unused functional units disabled to the extent possible to conserve power or processing resources. The operation of the resource controller 222 includes controlling the power to some or all of the other units comprising the decoder 200 based on analyzing the coded video data 202 and the administrative information 224. In the software embodiment, the resource controller 222 controls which of the functional units are loaded in memory and the order the functional units are loaded into memory.

The coded video data 202 includes administrative information 224. The administrative information 224 identifies image coding processes that have been performed on source video data by an encoder, and may also include suggestions for the decoder 200 for optional decoding by a functional unit such as post-processing unit(s) 216. The administrative information 224 may include a frame, MB headers, and "SEI" messages. The MB headers distinguish different coding elements from each other. The SEI messages provide a syntax for an encoder to provide to the decoder 200 ancillary signaling messages that may not have been coded as part of the formal standard. The decoder 200 interprets the administrative information 224 included with the coded video data 202 to identify encoding processes used by the encoder. The decoder 200 then 'undoes' the encoding processes to produce the decoded video data 204. In an embodiment, the administrative information 224 includes motion vectors 226 for the motion compensated predictor unit 218. In an embodiment, the administrative information 224 includes data intended to be used by the post-processing unit(s) 216 to select a mode for post-processing.

The resource controller 222 interprets the coded video data 202 and the administrative information 224 to determine which of the functional units of the decoder 200 need power, or in the software embodiment, which of the functional units need to be executed. In an embodiment, the resource controller 222 may determine which of several possible modes of motion compensated prediction were used to code the video sequence and, for decoding, may power a unit corresponding to the selected mode to the exclusion of units representing other coding modes. The resource controller 222 controls the power to the functional units with control lines 226. For example, the control lines 226 could turn on or off circuits corresponding to selected modes of operation within a functional unit or entire functional units (such as the post-processor 216). In an embodiment, the synchronized codec 201 may be a functional unit for decoding and the control lines 226 may turn on or off the entire synchronized codec 201. In the software embodiment, the power control 222 controls the loading and execution of the program modules corresponding to functional units or modes thereof.

The resource controller 222 may receive administrative information 227 from the channel buffer 206. For example, some information for determining which functional units need to be on can be obtained from the channel buffer 206 in the form of SEI messages. In general, information that may be useful for determining which functional units need to be turned on to decode the coded video data 202 may be obtained from the resource controller 222.

In an embodiment, the resource controller 222 may make a schedule 223 based on determining which of the functional units of the decoder 200 need power prior to substantive decoding of the coded video data 202 and then apply the schedule 223 during the decoding of the coded video data 202. For example, the resource controller 222 may determine by examining the channel buffer 206 that a portion of the coded video data 202 does not need the motion compensated predictor 218 or the frame store 220 to be decoded so the resource controller 222 may create a schedule 223 for the power to turn off for the motion compensated predictor 218 and the frame store 220 during the decoding of the portion of the coded video data 202. In an embodiment, the power control unit 222 creates the schedule 223 and then implements the schedule 223 using the control lines 226. In a software embodiment, the resource controller 222 may implement the schedule 223 by loading and executing the functional units. The resource controller 222 may turn on functional units just in time for decoding and may turn on functional units only for the duration of the processing of a portion of the encoded data 202 by the functional units.

The resource controller 222 may interpret multiple portions of the coded video data 202 and determine which units of the decoder 200 to provide power to based on which of the units multiple portions of the coded video data 202 need to be decoded. For example, for three portions of coded video data 202, the resource controller 222 may determine that the first portion and the third portion need the frame store 220 to be decoded, but that the second portion of coded video data 202 does not need the frame store 220 to be decoded. The resource controller 222 may determine to keep the power on for the frame store unit 220 for the second portion of encoded data 202 as it may be more efficient than turning the power off only for a single portion of coded video data 202. In a software embodiment, the resource controller 222 may keep the frame store 220 loaded during the decoding of the second portion of the coded video data 202.

The path from the encoded data 202 to the decoded data 204 may vary according to which of the functional units are provided power. The power control unit 222 may adjust the clock cycle time based on which function units receive power.

Figure 3:
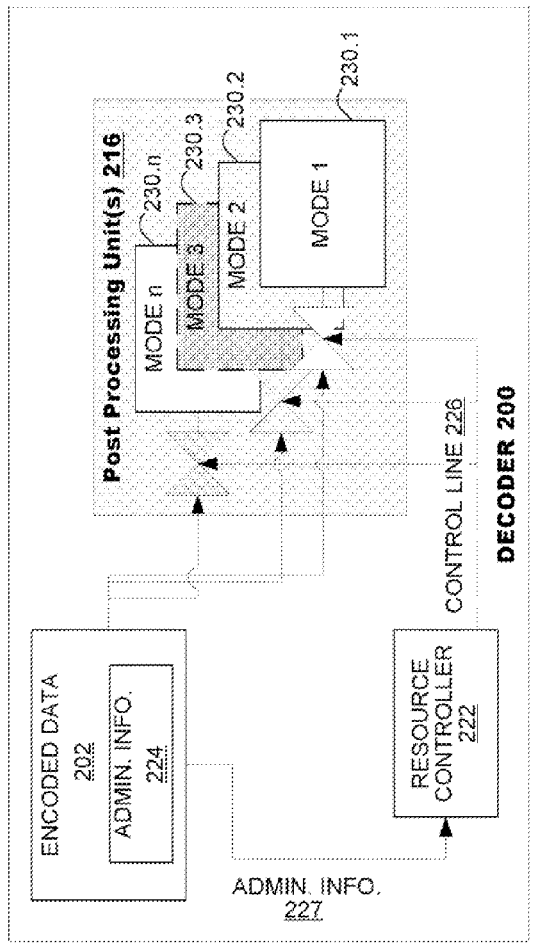
FIG. 3 illustrates a functional unit that comprises functional subunits that can be enabled and disabled by the resource controller according to an embodiment of the present invention.

FIG. 3 illustrates an embodiment of the present invention where the resource controller 222 may enable one sub-functional unit 230.1 to 230.n of a functional unit 216 based on determining that only one of the sub-functional units 230.1 to 230.n is needed to decode the coded video data 202. The post processor unit 216 may comprise functional units or sub-units 230.1-230.n that are represented here as mode 1 to mode n. Each mode 230 may represent a different post processing operation that can be performed on the encoded data 202. In some embodiments, which mode 230 to use on the encoded data 202 is contained in the administrative information 224. The resource controller 310 may analyze the administrative information 224 and may only provide power to the mode 230 that the administrative information 224 indicates should be used on the coded video data 202. The resource controller 222 may perform other power optimization techniques using the information of which mode 230 is needed to decode the coded video data 202. For example, the resource controller 222 may consider portions of the coded video data 202 before and portions after the portion of the coded video data 202 currently being operated on by the post processing unit(s) 216 in making power optimization decisions. For example, in an embodiment, it may be more efficient to keep a mode 230 powered on for a single portion of the coded video data 202 that does not need the mode 230 to be decoded rather than turning the power off and then turning the power on. The other units of the decoder 200 may also contain sub-units that are similarly controlled by the resource controller 222. Similarly, in a software embodiment the resource controller 222 may load only the software necessary to operate on the encoded data 202.

Figure 4:
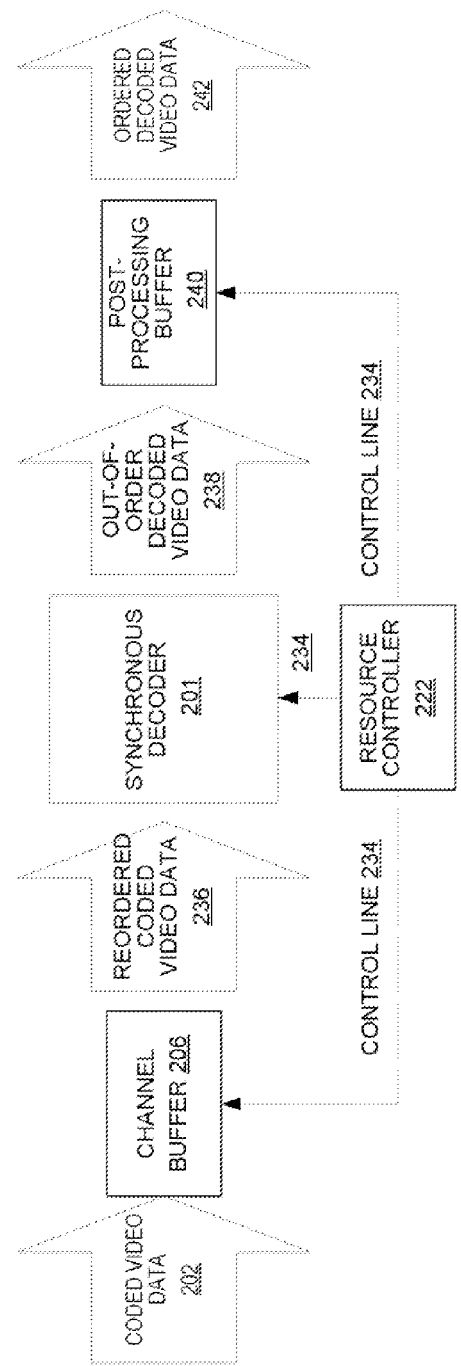
FIG. 4 illustrates the resource controller reordering the encoded data prior to decoding and then reordering the decoded data back into the original order so that the resources used to decode the encoded data are reduced.

FIG. 4 illustrates the resource controller 222 reordering the coded video data 202 to conserve resources. For example, in an embodiment, certain portions of the coded video data 202 may have had similar encoding decisions applied to encode the video data. The resource controller 222 may be able to reduce the resources necessary to decode the coded video data 202 by decoding similarly coded portions one after another. An embodiment to re-order the encoded data 202 includes, a channel buffer 206 and post-processing buffer 232 where the encoded data 202 can be reordered. The resource controller 222 examines the administrative information 224 and the coded video data 202 and reorders the coded video data 202 in the channel buffer 206 using control line 234. In an embodiment, the reordered coded video data 236 is then operated on by the synchronous decoder 201 and placed in the post-processing buffer 238. After being operated on by the synchronized codec 201 the out-of-order decoded video data 238 is stored in a post-processing buffer 240. The resource controller 222 then reorders the out-of-order decoded video data 238 back into the original order using control 234. The ordered decoded video data 242 is then available for consumption by another device such as a video display device. The resource controller 222 may select the order to process the coded video data 202 based on minimizing the amount of power used by the decoder 200 or based on minimizing the amount of time necessary to decode the coded video data 202. In a software embodiment, the resource controller 222 may select the order to process the coded video data 202 based on minimizing the number of times functional units that have to be loaded in memory or on minimizing the amount of time necessary to decode the coded video data 202.

In a software embodiment, resource controller 222 may load only some of the functional units of the decoder 200 and then partially process the coded video data 202 and then load the next set of functional units of the decoder 200 and operate on the coded video data 202 with the next set of functional units. In this way, the resource controller 222 may decode coded video data 202 in a pipeline fashion with limited resources.

Figure 5:
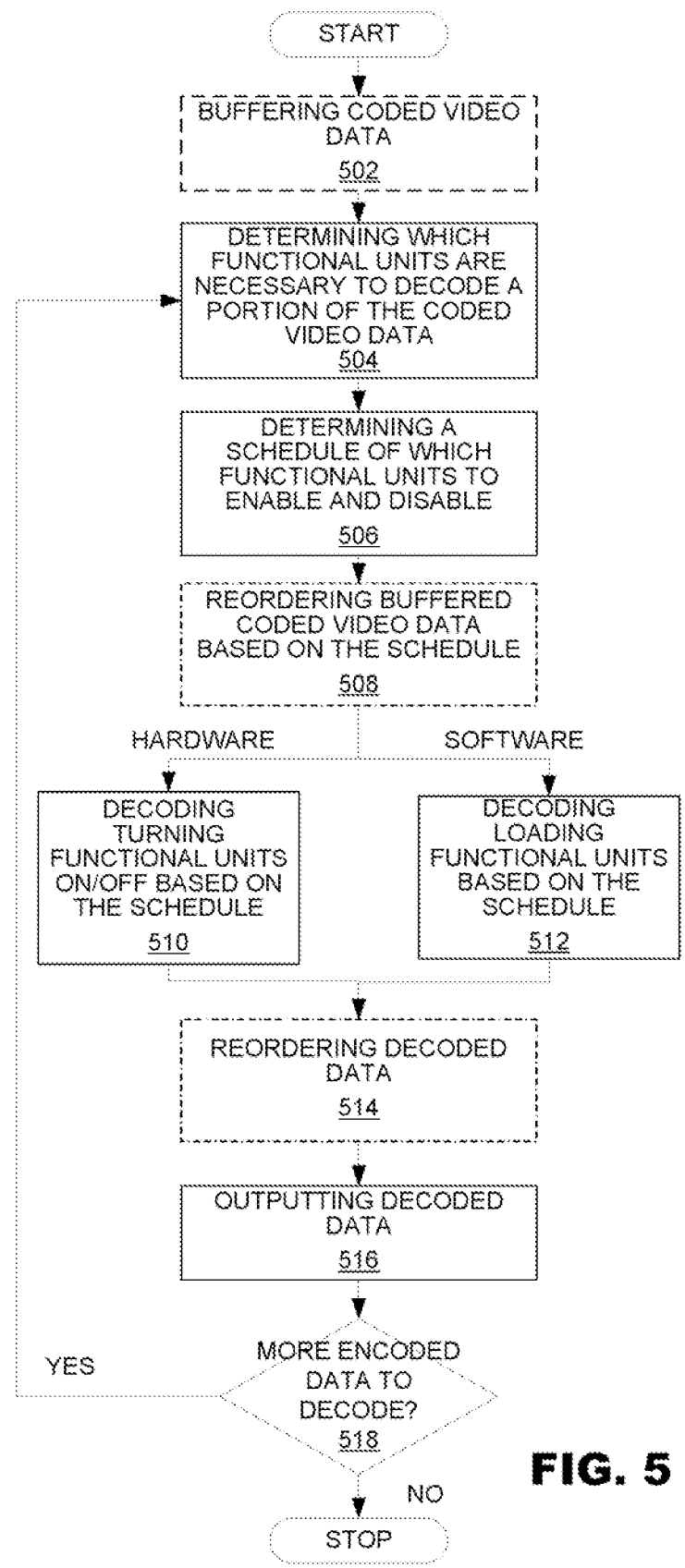
FIG. 5 illustrates a method of conserving resources during decoding according to an embodiment of the present invention.

FIG. 5 illustrates an exemplary method for reducing the resources needed for decoding coded video data by selectively enabling functional units of a decoder. The flow may begin with the optional step of buffering coded video data 502. The coded video data has been encoded by an encoder. The coded video data may be buffered prior to decoding by using known techniques. The flow may continue with determining which functional units are necessary to decode a portion of the coded video data 504. Administrative information is examined to determine which of the functional units are necessary to decode the coded video data. For example, the coded video data may include SEI headers. The flow continues with determining a schedule of which functional units to enable and disable. The schedule for a portion of the coded video data may depend not only on the needs of the portion of the encoded data, but also on the decoding needs of portions of the coded video data before the portion and portions of the encoded data after the portion. Optionally, the flow may continue with reordering the buffered coded video data 508. The buffer may be reordered based on the administrative information. For example, in a software embodiment, coded video data that needs to be operated on by a single functional sub-unit of a functional unit may be ordered together so that the single sub-unit only has to be loaded once. The flow may continue in a hardware embodiment with decoding and turning functional units on/off based on the schedule 510. The units and sub-units may be turned on and off based not only on the decoding needs of a portion of the coded video data, but also on the decoding needs of portions of the coded video data that come before and after the portion of the encoded data being operated on by the units and sub-units of the decoder. The coded video data is operated on by the functional units of the decoder. The flow continues, in a software embodiment of decoding and loading functional units based on the schedule 512. Optionally, the flow may continue with reordering the coded video data 514. If the coded video data was reordered in the input buffer, then the decoded video data is returned to the original order. The flow continues, with outputting the decoded video data 516. The decoded data may be a video stream for consumption by another device such as a video display device. The flow continues with checking if there is more coded video data to decode 518. If there is no more coded video data then the method ends. Otherwise, the method returns to determining which functional units are necessary to decode a portion of the coded video data 504.

Figure 6:
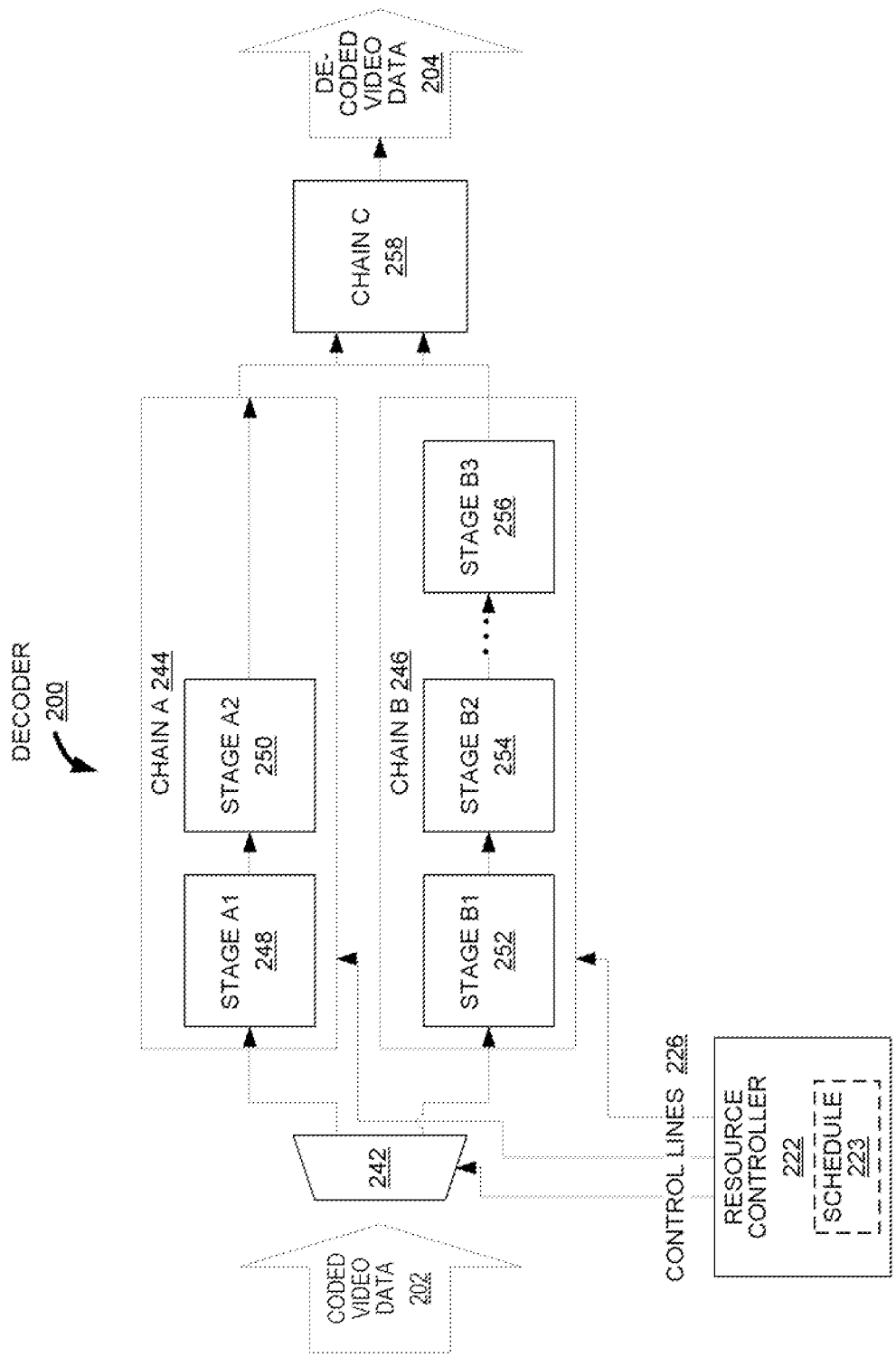
FIG. 6 illustrates an encoder for decoding encoded data in parallel according to an embodiment of the present invention.

FIG. 6 illustrates an embodiment of the present invention where portions of the coded video data 202 are being decoded in parallel. In an embodiment, the resource controller 222 may determine a schedule 223 for each of the different portions of encoded data 202 and the resource controller 202 may adjust the clock speeds of the different chains so that the different chains complete at the same time. The coded video data 202 may be decoded in parallel to reduce the resources needed to decode the data or to decrease the time needed to decode the encoded data 202. The coded video data 202 is passed into chain A 244 and chain B 246 by device 242, which in an embodiment may be a multiplexer. Each chain is decoding a portion of the encoded data 202. Each stage represents decoding of the encoded data 202 by a functional unit. Chain A 244 and chain B 246 may each be a separate decoder 200 or chain A 244 and chain B 246 may be different functional units of the same decoder 200. Chain A 244 and chain B 246 may decode the encoded data 202 in parallel. Chain A includes two stages stage A1 248 and stage A2 250. Each stage may be a functional unit such as the post-processor unit(s) 216 of FIG. 2 or each stage may be multiple functional units such as the entire synchronized codec 201 of FIG. 2. Each stage may be any number of functional units for decoding the encoding data 202. Chain B 246 includes three stages B1 252, B2 254, and B3 256. Chain A 244 and chain B 246 merge back into chain C 258. The resource controller 222 may determine a schedule 223 for each of the different portions of encoded data 202 and the resource controller 222 may adjust a clock speed for the chain A 244 and chain B 246 so that the two chains A 244, B 246 complete at the same time, or so that the two chains A 244, B 246 are coordinated with one another. In a software embodiment, the resource controller 222 may assign tasks to threads and threads to cores to maximize L2 cache coherence or to minimize the working set of page, or to allow different cores to be run in energy efficient modes. After chain C is completed the encoded data 202 is decoded data 204 and is ready to be consumed by another device such as a video display device.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

We claim:

1. A method of decoding coded video data, comprising:
   prior to substantive decoding of the coded video data, determining which functional units of a decoder a portion of the coded video data needs to be decoded;
   determining a schedule of which functional units to enable and disable based on which of the functional units are needed to decode the portion of the coded video data, the schedule identifying a timing for enabling or disabling each functional unit;
   reordering in an input buffer portions of the coded video data having an order based on the functional units needed to decode the portions of the coded video data;
   decoding the portion of the coded video data based on the schedule with at least one functional unit disabled to produce decoded video data in an output buffer; and
   reordering the portions of the decoded video data to the original order.

2. The method of claim 1, wherein determining further comprises:
   determining based on administration information included with the portion of the coded video data.

3. The method of claim 1, further comprising:
   adjusting a clock speed based on which functional units are enabled to decode the coded video data.

4. The method of claim 1, wherein determining further comprises:
   determining a schedule based on which functional units are necessary to decode the coded video data before the portion of the coded video data and based on which functional units are necessary to decode the coded video data after the portion of the coded video data.

5. The method of claim 1, wherein enabling the functional units comprises loading the functional unit in memory and disabling the functional units comprises not loading functional units in memory.

6. The method of claim 1, wherein enabling the functional units comprises providing power to the functional unit and disabling the functional units comprises not providing power to the functional unit.

7. The method of claim 1, wherein decoding further comprises:
   turning off at least one functional subunit of a loop filter for at least one portion of the coded video data.

8. The method of claim 1, wherein determining, further comprises:
   modifying the schedule after the portion of the coded video data has been partially decoded.

9. The method of claim 1, wherein reordering further comprises:
   reordering the portions to reduce the power consumption needed to decode the coded video data.

10. The method of claim 1, wherein reordering further comprises:
    reordering the portions to reduce the number of page loads needed to decode the coded video data.

11. A video decoder with resource conservation, comprising:
    a plurality of functional units each provided to perform a respective decoding process in the video decoder, various ones of the functional units provided with selectively controllable power inputs;
    a buffer to store the coded video data prior to operation by the functional units;
    a resource controller configured to determine a schedule for providing power to the functional units for a portion of the coded video data stored in the buffer based at least on which of the functional units are necessary to decode the portion of the coded video data, the schedule identifying a timing for enabling or disabling each functional unit, and the resource controller further configured to apply the schedule using the power inputs during decoding of the portion of the coded video data; and
    an output buffer for storing decoded video data after decoding by the functional units;
    wherein the resource controller is further configured to reorder in the input buffer portions of the coded video data having an order based on the functional units needed to decode the portions of the coded video data, and to reorder the portions in the output buffer to the original order.

12. The video decoder of claim 11, wherein the resource controller is further configured to determine the schedule based on which functional units are necessary to decode the coded video data before the portion of the coded video data and based on which functional units are necessary to decode a portion of the coded video data after the portion of encoded video data.

13. The video decoder of claim 11, wherein the resource controller is further configured to adjust a clock speed based on which of the functional units are turned off to decode the encoded video data.

14. The video decoder of claim 11, wherein at least some of the functional units are arranged for decoding portions of the encoded video data in parallel, and wherein the resource controller is further configured to adjust a clock speed based on the which of the functional units are necessary to decode the portions of the encoded video data.

15. A non-transitory computer-readable medium comprising:
    a first set of codes for causing a computer to determine, prior to substantive decoding of the coded video data, which functional units of a decoder a portion of the coded video data needs to be decoded;
    a second set of codes for causing the computer to determine a schedule of which functional units to enable and disable based on which of the functional units are needed to decode the portion of the coded video data, the schedule identifying a timing for enabling or disabling each functional unit and reorder portions of the coded video data having an order based on the functional units needed to decode the portions of the coded video data;
    a third set of codes for causing the computer to decode the portion of the coded video data based on the schedule with at least one functional unit disabled and reorder the portions of the decoded video data to the original order.

16. A method of decoding coded video data, comprising:

prior to substantive decoding of the coded video data, determining which functional units of a decoder a portion of the coded video data needs to be decoded;

determining a schedule of which functional units to enable and disable based on which of the functional units are needed to decode the portion of the coded video data, the schedule identifying a timing for enabling or disabling each functional unit;

reordering portions of the coded video data having an order based on the functional units needed to decode the portions of the coded video data;

on a portion by portion basis:
    loading the functional units in memory that are scheduled to be enabled during decoding of the coded video data, the loading skipping functional units in memory that are scheduled to be disabled during decoding of the coded video data;

decoding the portion of the coded video data based on the schedule to produce decoded video data; and reordering the portions of the decoded video data to the original order.

\* \* \* \* \*